(12) United States Patent
Pellmann et al.

(10) Patent No.: US 9,057,114 B2
(45) Date of Patent: Jun. 16, 2015

(54) METHOD FOR PRODUCING A MOTOR VEHICLE COMPONENT, AND A BODY COMPONENT

(75) Inventors: Markus Pellmann, Sassenberg (DE); Martin Pohl, Altenbeken (DE); Martin Schroeter, Paderborn (DE); Stefan Adelbert, Delbrueck (DE); Otto Buschsieweke, Paderborn (DE); Christian Handing, Langenberg (DE)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 1051 days.

(21) Appl. No.: 13/069,571

(22) Filed: Mar. 23, 2011

(65) Prior Publication Data

US 2011/0232808 A1 Sep. 29, 2011

(30) Foreign Application Priority Data

Mar. 25, 2010 (DE) .......................... 10 2010 012 830

(51) Int. Cl.
| | |
|---|---|
| B23K 31/02 | (2006.01) |
| C21D 1/00 | (2006.01) |
| C22F 1/16 | (2006.01) |
| C21D 9/00 | (2006.01) |
| B62D 21/15 | (2006.01) |
| B62D 25/14 | (2006.01) |
| C21D 1/30 | (2006.01) |
| C21D 9/50 | (2006.01) |
| B60R 19/02 | (2006.01) |
| C21D 1/09 | (2006.01) |
| C21D 1/673 | (2006.01) |

(52) U.S. Cl.
CPC .............. *C21D 9/0068* (2013.01); *B60R 19/02* (2013.01); *B62D 21/15* (2013.01); *B62D 25/14* (2013.01); *C21D 1/09* (2013.01); *C21D 1/30* (2013.01); *C21D 1/673* (2013.01); *C21D 9/50* (2013.01); *C21D 2221/00* (2013.01)

(58) Field of Classification Search
None
See application file for complete search history.

(56) References Cited

U.S. PATENT DOCUMENTS

| 3,240,639 A | * | 3/1966 | Lihl | .............................. | 148/565 |
| 3,352,724 A | * | 11/1967 | McNitt et al. | .................. | 148/575 |
| 4,840,686 A | * | 6/1989 | Arnett et al. | ................... | 148/334 |

(Continued)

FOREIGN PATENT DOCUMENTS

| CN | 1071960 A | 5/1993 |
| CN | 101082101 A | 12/2007 |

(Continued)

*Primary Examiner* — Kiley Stoner
(74) *Attorney, Agent, or Firm* — Henry M. Feiereisen LLC

(57) ABSTRACT

A method for producing a structural and/or safety-related motor vehicle component having at least one hot-formed and press-hardened part constructed from high-strength steel includes the steps of partially heat-treating a region of the motor vehicle component by heating the region to a heat-up temperature in a temperature range between 500° C. and 900° C.; maintaining the heat-up temperature for a duration of a holding time; and cooling down from the heat-up temperature in one or more phases. A body component constructed as a structural and/or safety-related motor vehicle component from a steel sheet blank that has been hot-formed and press-hardened includes joining flanges and/or coupling locations and/or safety-related parts, wherein the joining flanges, coupling locations and/or safety-related parts are partially heat-treated in several steps with the disclosed method.

20 Claims, 5 Drawing Sheets

(56) References Cited

U.S. PATENT DOCUMENTS

| | | | |
|---|---|---|---|
| 5,040,399 A * | 8/1991 | Knapper et al. | 72/200 |
| 5,916,389 A | 6/1999 | Lundström | |
| 5,972,134 A | 10/1999 | Buschsieweke et al. | |
| 6,156,134 A * | 12/2000 | Shimizu et al. | 148/526 |
| 2002/0069506 A1* | 6/2002 | Brodt et al. | 29/505 |
| 2003/0205910 A1* | 11/2003 | Tjoelker et al. | 296/146.6 |
| 2004/0108306 A1* | 6/2004 | Wiezbowski et al. | 219/121.85 |
| 2006/0130940 A1* | 6/2006 | Kollaritsch et al. | 148/518 |
| 2007/0107819 A1 | 5/2007 | Gehringhoff et al. | |
| 2008/0196800 A1* | 8/2008 | Beenken et al. | 148/643 |
| 2008/0199347 A1* | 8/2008 | Barges et al. | 420/120 |
| 2008/0286603 A1* | 11/2008 | Oh et al. | 428/684 |
| 2009/0020194 A1* | 1/2009 | Minemura et al. | 148/572 |
| 2009/0238715 A1* | 9/2009 | Cho et al. | 420/89 |
| 2010/0101296 A1 | 4/2010 | Handing | |
| 2010/0252151 A1* | 10/2010 | Furrer et al. | 148/714 |
| 2010/0308623 A1* | 12/2010 | Bodin et al. | 296/193.06 |
| 2011/0016719 A1* | 1/2011 | Lee et al. | 29/897.2 |
| 2011/0083774 A1* | 4/2011 | Jin et al. | 148/533 |
| 2011/0198820 A1* | 8/2011 | Janzen et al. | 280/124.106 |
| 2011/0232806 A1* | 9/2011 | Pellmann et al. | 148/328 |
| 2011/0233946 A1* | 9/2011 | Pellmann et al. | 293/132 |
| 2011/0291431 A1* | 12/2011 | Buschsieweke et al. | 293/133 |
| 2012/0060982 A1* | 3/2012 | Bohner et al. | 148/653 |
| 2012/0103974 A1* | 5/2012 | Buschsieweke et al. | 219/647 |
| 2012/0211126 A1* | 8/2012 | Zhang et al. | 148/508 |
| 2012/0291928 A1* | 11/2012 | Celotto | 148/623 |

FOREIGN PATENT DOCUMENTS

| | | | |
|---|---|---|---|
| CN | 101263239 A | | 9/2008 |
| DE | 197 23 655 | | 12/1997 |
| DE | 197 43 802 | | 3/1999 |
| DE | 10 2004 023 579 A1 | | 12/2005 |
| DE | 102005054847 | | 10/2007 |
| DE | 102008021492 | | 7/2009 |
| EP | 2 143 621 A1 | | 1/2010 |
| ES | 2345029 A | * | 9/2010 |
| JP | SU-1330191 A | * | 8/1987 |
| JP | 04-289122 A | * | 10/1992 |
| JP | 11-181516 A | * | 7/1999 |
| JP | 2006-263711 A | * | 10/2006 |
| KR | 2002-0049667 A | * | 6/2002 |
| KR | 10-0347582 B1 | * | 7/2002 |
| KR | 2003-0075324 A | * | 9/2003 |
| KR | 2004-064386 A | * | 7/2004 |
| KR | 10-0848784 B1 | * | 7/2008 |
| KR | 2010-107820 A | * | 10/2010 |
| WO | WO 2008/018624 A1 | * | 2/2008 |

* cited by examiner

METHOD FOR PRODUCING A MOTOR VEHICLE COMPONENT, AND A BODY COMPONENT

CROSS-REFERENCES TO RELATED APPLICATIONS

This application claims the priority of German Patent Application, Serial No. 10 2010 012 830.9-24, filed Mar. 25, 2010, pursuant to 35 U.S.C. 119(a)-(d), the content of which is incorporated herein by reference in its entirety as if fully set forth herein.

This is one of five applications all filed on the same day. These applications deal with related inventions. They are commonly owned and have the same inventive entity. These applications are unique, but incorporate the others by reference. Accordingly, the following U.S. patent applications are hereby expressly incorporated by reference: "CROSS MEMBER", representative's Ser. No. 13/069,510; "SIDE RAIL", representative's Ser. No. 13/069,545; "TRANSMISSION TUNNEL", representative's Ser. No. 13/069,586; and AUTOMOBILE COLUMN", representative's Ser. No. 13/069,537.

BACKGROUND OF THE INVENTION

The present invention relates to a method for producing a motor vehicle component having at least one hot-formed and press-hardened component made of high-strength sheet steel. The present invention also relates to a body component, in particular a body component produced with the method.

It would be desirable and advantageous to provide an improved method for producing a motor vehicle component at low cost in industrial-scale production which obviates prior art shortcomings, while maintaining the reliability of the component in operation. It would be desirable and advantageous to provide a body component produced with this method.

SUMMARY OF THE INVENTION

According to one aspect of the invention, a method for producing a motor vehicle component with at least one hot-formed and press-hardened component constructed from high-strength steel, wherein the motor vehicle component is used as structural component and/or safety-related component in a motor vehicle, includes the steps of partially heat-treating a region of the motor vehicle component by heating the region to a heat-up temperature in a temperature range between 500° C. and 900° C., maintaining the heat-up temperature for a duration of a holding time; and cooling down from the heat-up temperature in at least one phase.

In accordance with the present invention, the material properties desired for the motor vehicle component can advantageously be designed and produced with a reliable process. The component produced by hot-forming and press-hardening has a hard and brittle structure. The material structure of the component is changed in the heat-treated regions by the partial heat treatment below the austenitic temperature with the method of the invention, thereby producing a material structure with enhanced ductility. Heat-treating a particular area of a component, such as the cross member, will hereinafter also be referred to a "partially" heat-treating or "partial" heat treatment of a component or an area of a component. According to the invention, heat-up begins at a start temperature which the component assumes after the press-hardening process. For example, this can be the ambient temperature. However, the start temperature of the heat-up is always lower than the martensitic start temperature (MS), suitably less than 200° C.

According to another advantageous feature of the present invention, stress in the heat-treated regions may be reduced by selecting the temperature range for heat-up or for holding the heat-up temperature between 500° C. and 900° C., for example at joining flanges or in the marginal locations of openings, which are subjected to the heat treatment according to the invention.

Taking as an example a motor vehicle component employed as a structural component or a safety-related component in an integral body-frame body, the heat-treated region has a particularly advantageous effect on the crash property of the body in applications of the motor vehicle component. For example, if a region embodied as a joining flange is heat-treated with the method of the invention, then this joining flange does not tend to tear or strip or form cracks in the event of an accident, so that the surrounding structural and safety-related components stay together. This is particularly advantageous for the protection of occupants in a passenger compartment. The term joining flange in the context of the present invention is intended to indicate a flange region provided for attaching another component or part of another component. The connection can hereby be produced by gluing, riveting, welding, brazing or similar joining processes.

Another advantage is attained, in regions which experience an intended deformation in the event of an accident. This deformation may be provided to introduce into the body energy to be dissipated, thereby once more enhancing the crash protection for vehicle occupants. Another application is, for example, the intentional deformation of individual regions to facilitate repairs after an accident.

In the event of a crash, the regions that were heat-treated with the method of the invention can be deformed so as to enable the intentional formation of wrinkles and hence intentional dissipation of energy. The heat-treated regions also have a lesser tendency for crack formation, because the structure is more ductile in comparison to the hot-formed and press-hardened, hard and brittle structure.

The method of the invention provides a reliable process for obtaining the desired material properties in industrial-scale production. Any variation in the manufacturing tolerances during production can thus be largely eliminated, so that when employing, for example, a body with specific crash points designed by a CAD-computation, a high manufacturing precision can be ensured by using motor vehicle components produced with the method of the invention.

According to another advantageous feature of the present invention, the partial heat treatment may be performed on joining flanges of the component. The joining flanges then advantageously assume ductile material properties. In a material connection by thermal joining, the structure is altered in the heat treatment zone of the joining method. A ductile section of the component is here particularly advantageous for the welding process and for the material structures produced after the welding process and the thermal treatment zone. These material structures are also transformed into a ductile material structure region by a partial heat treatment performed with the method of the invention. This again advantageously enhances the durability of the connected weld seams in the event of an accident of the motor vehicle. The term weld seam in the context of the invention refers to all weld seams produced by thermal joining. For example, these can be continuous longitudinal weld seams, but also spot welds or discontinuous weld seams.

According to another advantageous feature of the present invention, the partial heat treatment may be performed on openings of the component. These openings may be introduced in the component to optimize its weight or for passing through other components, for example a gear shift lever or a wiring harness and the like. In particular, cracks which may extend over the entire component in the region of the openings and also in the end region of openings may develop in the event of an accident. By reducing the surface stress, a ductile material structure is produced in this region. This counters the formation of cracks and impedes unintentional deformation of the component.

Moreover, stress from reverse bending stresses, which may be introduced into the body by, for example, body torsion or other driving parameters, for example engine vibrations and the like, can thus be particularly advantageously affected. A particular positive effect can be attained by reducing the surface stress in the end region of openings by partial heat treatment with the method of the invention, thereby improving the durability of a motor vehicle body.

According to another advantageous feature of the present invention, the vehicle component may be constructed by coupling at least two components, wherein the heat treatment is performed at the coupling locations. The at least two components may be at least two hot-formed and press-hardened components. However, alternatively only one hot-formed and press-hardened component may be used which is coupled with a second component produced by a conventional manufacturing process or by a sheet metal machining process. Advantageously, the hot-formed and press-hardened component can be provided with the same positive effects according to the invention that were already described above.

Treatment of the coupling locations with a method according to the invention may also advantageously affect their load carrying capability and durability. In the coupling region produced by thermal joining, a heat treatment zone is produced in a weld seam, which again is accompanied by a structural change. The implemented coupling process, for example inert gas welding, laser welding, spot welding, roll seam welding and the like, produce different material properties which sometimes also have undesirable side effects. For economic reasons in industrial-scale production, however, the advantages of the respective employed welding process are greater than their disadvantages. However, these disadvantages can be cost-effectively eliminated with the method of the invention even in industrial-scale production.

The heat treatment of the weld seams is particularly advantageous for their durability, corrosion resistance and deformability.

According to another advantageous feature of the present invention, heat-up may be performed over a time period of up to 30 seconds, suitably of up to 20 seconds. Currently preferred is a time period of up to 10 seconds, or of up to 5 seconds. Heat-up may take place according to the method of the invention in a progressive, linear or diminishing temperature increase over time. A short heat-up phase for reaching the heat-up temperature, in combination with a subsequent holding phase where the heat-up temperature is held constant during a holding time, is particularly advantageous for the process reliability of the partial heat treatment.

According to another advantageous feature of the present invention, the holding time may extend over a time period of up to 30 seconds. Suitably, the holding time extends over a time period of up to 20 seconds. Currently preferred is a holding time of up to 10 seconds, or of up to 5 seconds. By the intentional control of the material structure transformation at a constant temperature, only affected by the duration of the holding time, the hardening and tempering process within the context of the invention can be particularly reliably performed. More particularly, the attained heat-up temperature is held substantially constant during the holding time. An additional temperature increase or temperature decrease during the holding time, with a temperature difference range relative to the heat-up temperature of maximally 100° C., is also feasible within the context of the invention.

According to another advantageous feature of the present invention, the short time intervals for the heat-up and holding time may largely prevent heat transfer by thermal conduction. In addition, the method of the invention may advantageously also be integrated with heat forming steps and additional subsequent manufacturing steps into the cycle time of existing production processes. The cycle times can thereby be located in a time window between 5 seconds and 30 seconds, suitably between 10 seconds and 15 seconds.

The method steps of heat-up and holding can be performed in a single apparatus which can also be used to hot-form and press-harden the component. However, the components may also be moved to a separate apparatus after hot-forming and press-hardening, where heat-up and holding of the heat-up temperature are performed. Heat-up and holding the temperature can be accomplished, for example, with inductive heating or similar heating methods, which can be integrated in the production process depending on the particular application.

According to another advantageous feature of the present invention, cooldown is performed in at least two phases. In the context of the invention, the two cooldown phases can have a substantially identical duration. Particularly preferred, the first cooldown phase has a longer duration than the second cooldown phase. The cooldown phases can also be performed in a single apparatus or in the apparatus for heat treatment or in a separate cooldown vessel. It is also feasible within the context of the invention to perform the at least two different cooldown phases in two separate cooldown vessels.

Because the cooldown process of the thermal treatment according to the invention has several phases, the desired stage for the structural transformation and hence the desired material property in the partially heat-treated regions can be attained with high process reliability, cost-effectively and with high accuracy. It is also possible with the multi-phase cooldown to integrate the cooldown process in the ongoing production of a produced component so that it can be adjusted individually over a wide range to the cycle times of previous and subsequent processing steps, without adversely affecting the quality of the attainable structural transformations.

According to another advantageous feature of the present invention, the second cooldown phase may be performed over a time interval of up to 120 seconds, suitably of up to 60 seconds. In other advantageous embodiment, the motor vehicle component may be cooled in the first cooldown phase to a temperature between 200° C. and 900° C., suitably between 300° C. and 800° C. Currently preferred is a temperature between 500° C. and 700° C.

In a second phase, the motor vehicle component is cooled to a target temperature. The target temperature within the context of the invention is below 200° C. There is no longer a thermally-induced component distortion at a component temperature of 200° C., which could otherwise have negative implications for the production reliability of the method. It may also be envisioned within the context of the invention that the component is cooled down to room temperature. The cooldown curves of the temperature difference and the cooldown curve during the cooldown time, respectively, according to the invention can then again be progressive, linear, but also diminishing. This advantageously essentially eliminates further component distortion after reaching the first cooldown temperature.

According to another advantageous feature of the method of the present invention, heating to the heat-up temperature takes place by way of induction and/or infrared heating. Infrared heating in the context of the invention refers to, for example, infrared radiators producing heat with lamps. In this way, very small local regions with a clearly defined boundary region can advantageously be heat-treated within the context of the overall method. The transition zone between the hot-formed and press-hardened region that was not heat-treated and the partially heat-treated region is according to the method of the invention advantageously less than 100 mm, suitably less than 50 mm. Currently preferred is a transition zone between 1 and 20 mm. In this way, small regions with sharp boundaries can be intentionally locally heat-treated.

According to another advantageous feature of the present invention, a body component is constructed as a structural component and/or as a safety-related component for a motor vehicle by hot-forming and press-hardening a steel sheet blank. The body component includes joining flanges and/or coupling locations and/or safety-related elements which are partially heat-treated by heating a region of the joining flanges, coupling locations or safety-related elements to a heat-up temperature in a temperature range between 500° C. and 900° C., maintaining the heat-up temperature for a duration of a holding time, and cooling down from the heat-up temperature in at least one phase. Other crash-relevant component regions may also be partially heat-treated with the aforementioned steps.

The body component produced in this manner can advantageously deform in the event of an accident in a desired manner. This deformation behavior defined specifically for the component can be implemented, for example, through the wrinkle formation. In addition, the joining flanges and/or coupling locations become rather ductile with the heat treatment according to the invention, so that they have a tendency to deform rather than a tendency to tear in the event of an accident.

A body component in the context of the invention refers to an A-column, a B-column, a C-column, a D-column, a bumper, a crash box, a longitudinal front beam, a longitudinal rear beam, a tunnel, for example in form of a transmission tunnel, a rocker panel, a cross beam, a seat cross beam, a heel plate, a roof support beam, a floor panel, a sidewall, a vehicle door, a trunk lid, an engine lid, a roof area or an instrument support with different added components. Additional sheet steel components of a motor vehicle may also be regarded as a body component.

A crash-relevant component region is, for example, an attachment region of an A-, a B- or a C-column, or a coupling region of a rocker panel with a cross beam on a longitudinal beam. Overall, crash-relevant component regions within the context of the invention are those component regions which are subjected to particularly high stress in a vehicle crash. These are, for example, attachment regions where two components are coupled together, or transition zones, for example the radii of a door opening in a vehicle body, or similar regions which must adhere to stringent requirements with respect to a deformation and durability in the event of a vehicle crash.

Regions which have a defined deformation in the event of a vehicle crash can be created in a side rail heat-treated with the method of the invention. This deformation may occur, for example, in the form of wrinkling or folding.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
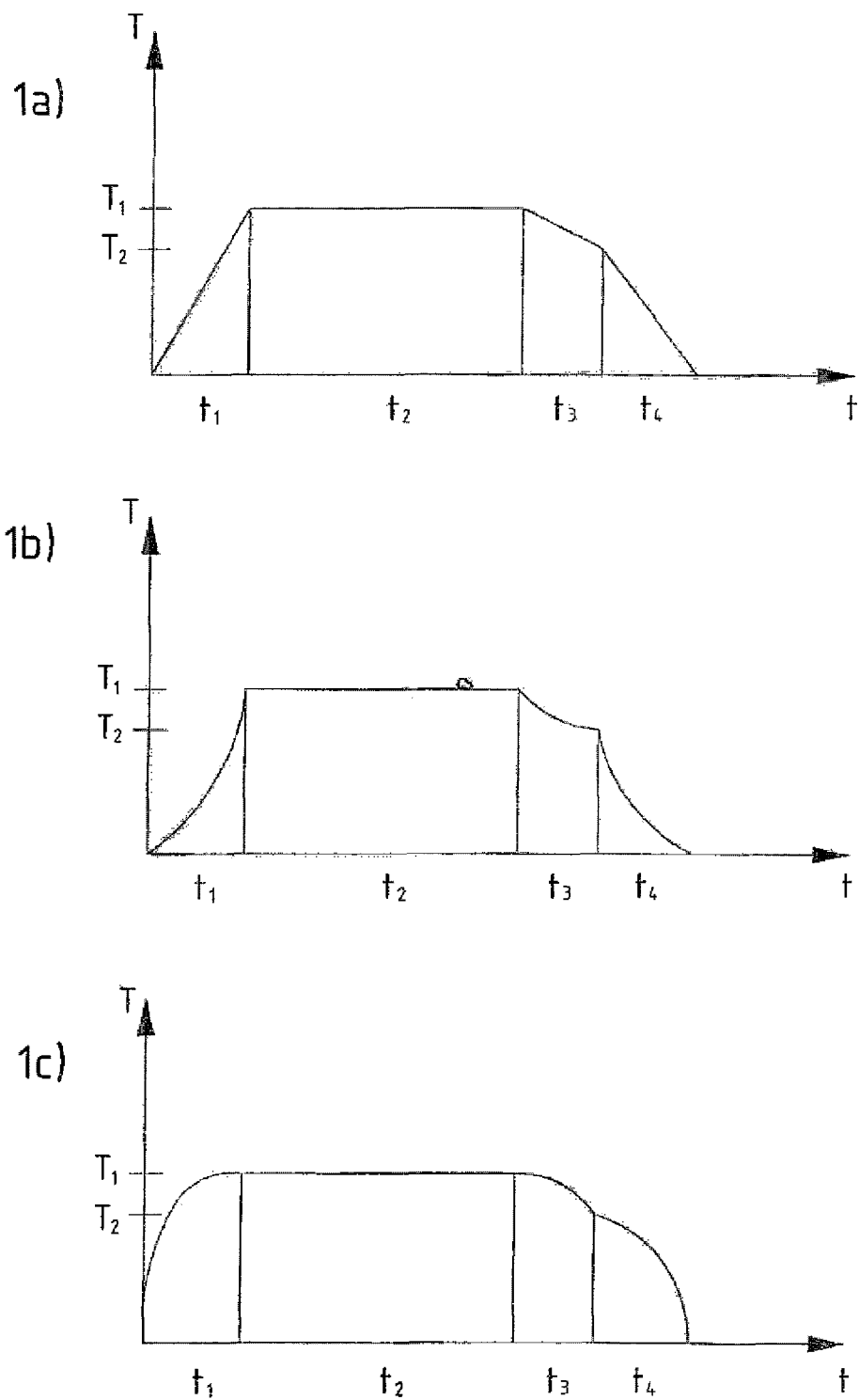
FIGS. 1a), b), c) show different temperature curves of the individual steps of the heat treatment over time.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a temperature curve as a function of time with the time intervals heat-up time (t1), holding time (t2), cooldown time first phase (t3) and cooldown time second phase (t4) according to the invention. In addition, the heat-up temperature (T1) and a first cooldown temperature (T2) are shown on the temperature axis.

Starting with a hot-formed and press-hardened motor vehicle component which is essentially at a temperature below 200° C., this vehicle component is heated during the heat-up time to the heat-up temperature (T1). With a starting temperature of below 200° C., but still above room temperature, the residual thermal energy from the hot-forming and press-hardening process is used for the partial heat treatment within the context of the invention.

Heat-up includes a linear temperature increase as a function of time. After the heat-up time (t1), the heat-up temperature (T1) is maintained during a holding time (t2). The heat-up temperature (T1) is held essentially constant during the entire holding time (t2). Temperature variations in form of a temperature increase or a temperature decrease are not illustrated, but may occur within the context of the invention during the holding time (t2) to affect the desired changes in the material structure, but also for cost reasons of the production process.

At the end of the holding time (t2), a first cooldown to a cooldown temperature (T2) occurs. The temperature hereby decreases linearly during the cooldown time of the first phase (t3) to the cooldown temperature (T2). The cooldown temperature (T2) may be in a range between 100° C. and a heat-up temperature (T1).

In a subsequent second cooldown phase, an additional linear temperature decrease takes place during the cooldown time of the second phase (t4). The temperature can hereby essentially be lowered to room temperature or to a desired (unillustrated) target temperature. It would also be feasible within the context of the invention to include additional cooldown phases, which are not illustrated.

FIG. 1b shows a substantially similar temporal arrangement of the heat treatment, with the difference to FIG. 1a that the temperature increases progressively during the heat-up time (t1), whereas the cooldown during the first and second phase have each a decreasing temperature over time (t3, t4).

FIG. 1c shows, in addition to FIGS. 1a and 1b, that the temperature curve has a diminishing temperature increase during the heat-up time (t1) and the functional dependence of the temperature decrease over time (t3, t4) is progressive during each of the various cooldown phases.

In the context of the invention, it would also be feasible to combine the temperature dependence over time in mixed forms, such as progressive, linear and diminishing, during the holding time (t2).

Figure 2:
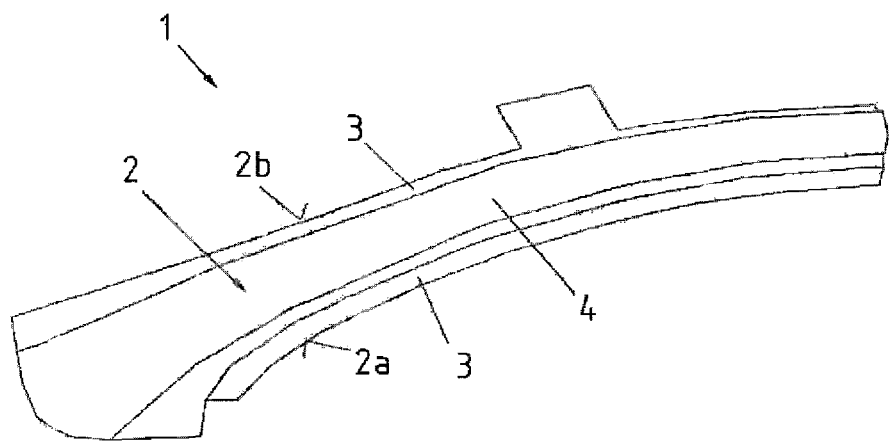
FIG. 2 shows a perspective view of an A-column.

FIG. 2 shows a motor vehicle component 1 in form of an A-column 2 of an (unillustrated) motor vehicle body. Arranged on the respective sides 2a, 2b of the A-column 2 are joining flanges 3 which are heat-treated with the method of the invention. The A-column 2 then has high strength and hardness in its center profile sections 4 which guarantees protection of the passenger compartment in the event of a crash, whereas the joining flanges 3 have a rather ductile material characteristic relative to the center profile section, so that components attached to the joining flanges 3 (which are not illustrated here) remain connected with the A-column 2, without producing tears at the connecting locations characterized by the joining flanges 3.

Figure 3:
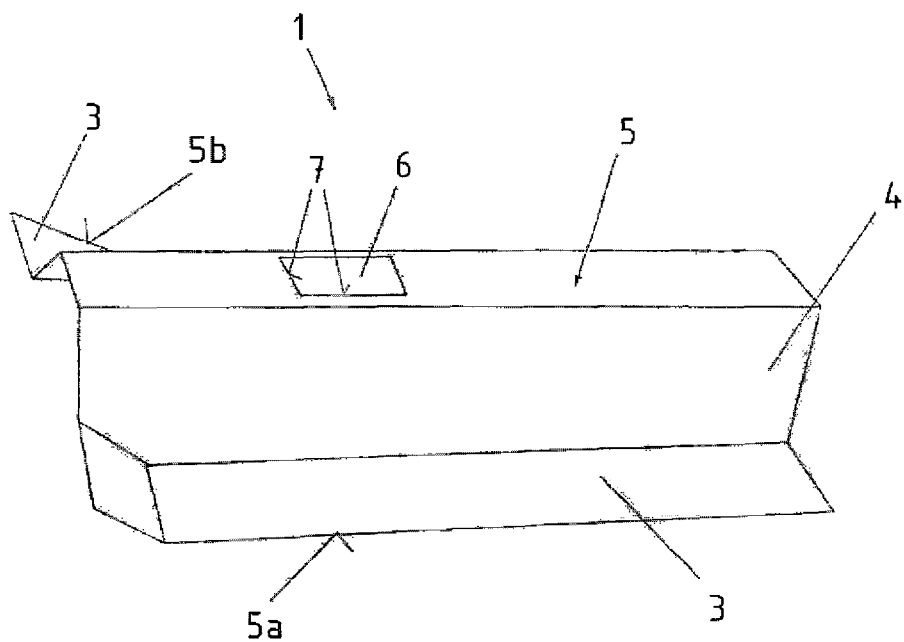
FIG. 3 shows a perspective view of a frame tunnel.

FIG. 3 shows a motor vehicle component 1 in form of a transmission tunnel 5. The transmission tunnel 5 has an opening 6, as well as joining flanges 3 disposed on both sides 5a, 5b, and a center profile segment 4. The end regions 7 of the opening 6 and the joining flanges 3 can here also be heat-treated with the method of the invention. In the event of the vehicle crash, the formation of tears, which would otherwise adversely affects the deformation characteristic of the motor vehicle component 1, here in form of the transmission tunnel 5, is intentionally prevented with the heat treatment of the end regions 7 of the opening 6.

Figure 4:
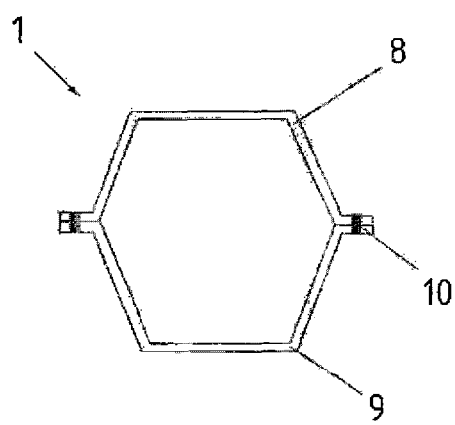
FIG. 4 shows a motor vehicle component consisting of two coupled components.

FIG. 4 shows a motor vehicle component 1 constructed of two coupled components 8, 9. In this illustrated embodiment, an upper (in relation to the image plane) component 8, a hot-formed and press-hardened component and a lower (in relation to the image plane) component 9 form a component produced with conventional forming methods. The two components 8, 9 are coupled together at coupling locations 10. The coupling locations 10 were heat-treated following the coupling process using a method according to the invention.

Figure 5:
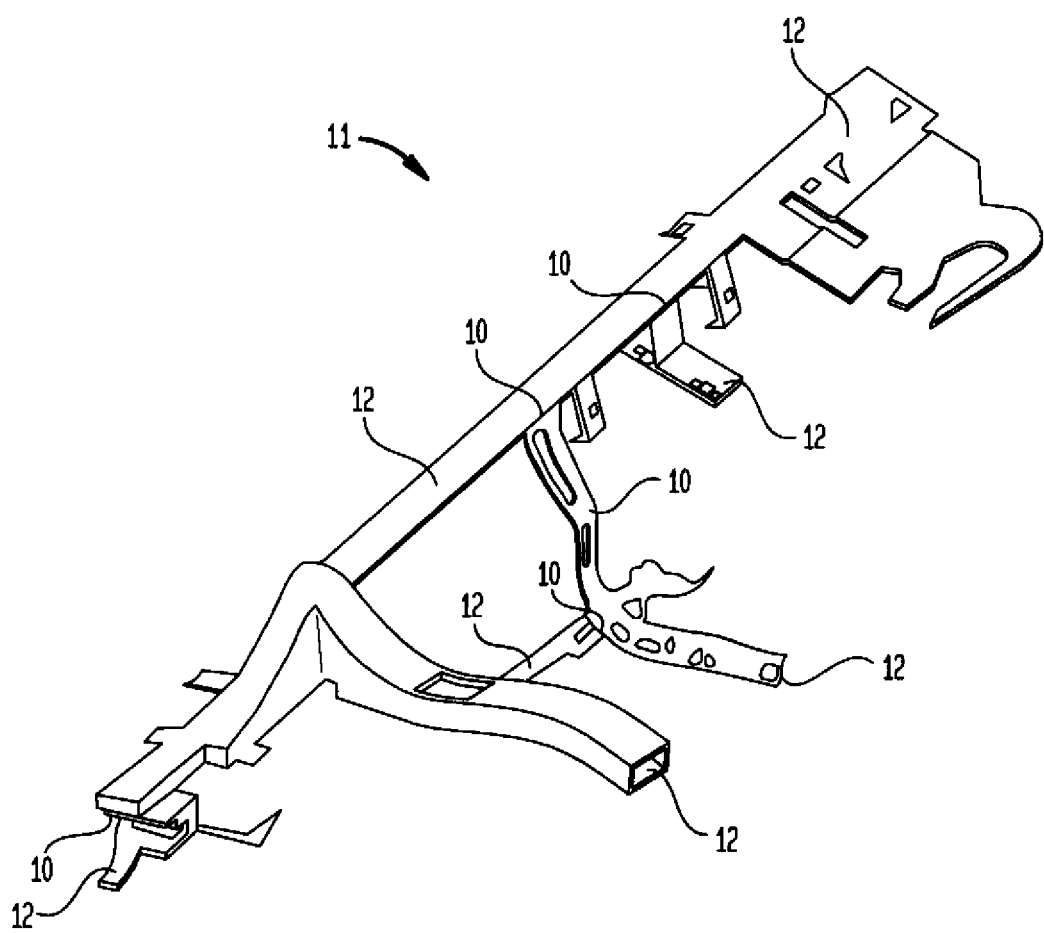
FIG. 5 shows an instrument carrier made of several components.

FIG. 5 shows an instrument carrier 11 constructed of several individual components 12. The individual components 12 are here coupled with each other at coupling locations 10.

Figure 6:
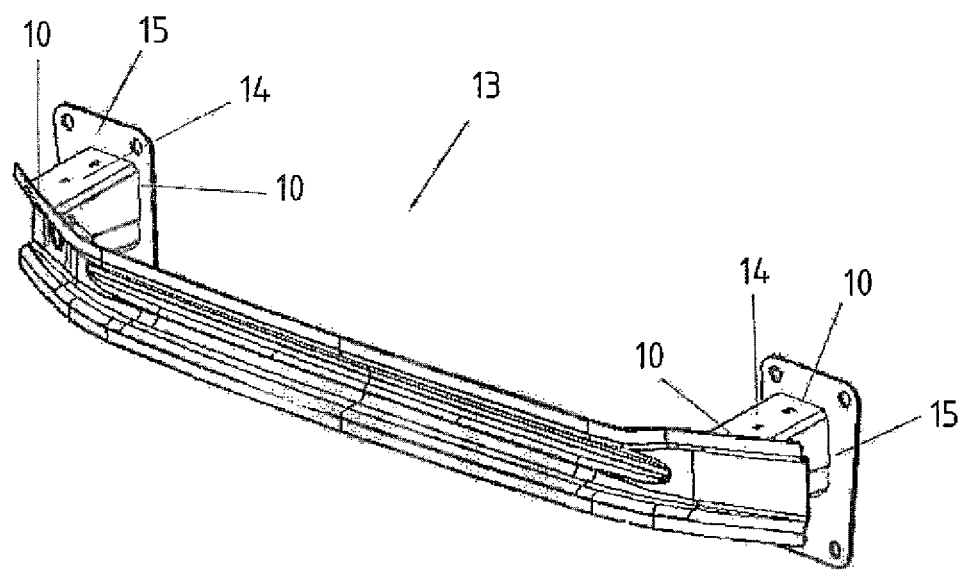
FIG. 6 shows a bumper with various add-on components.

FIG. 6 shows a bumper 13 with two crash boxes 14 and mounting plates 15 coupled to the crash boxes. The bumper 13 is coupled to the crash boxes 14 at coupling locations 10 through thermal joining.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A method for producing a motor vehicle component, comprising the steps of:
    heating at least one region of a hot-formed and press-hardened part to a heat-up temperature below a temperature at which austenite begins to form;
    maintaining the hot-formed and press-hardened part at the heat-up temperature for a holding time sufficient to reduce a hardness of the at least one region to a level smaller than a hardness of another region of the hot-formed and press-hardened part; and
    cooling down the hot-formed and press-hardened part in at least two phases for time periods sufficient to maintain the reduced hardness in the at least one region and the hardness in the other region of the hot-formed and press-hardened part, thereby forming the motor vehicle component,
    wherein the time period of a first phase of the two cooldown phases is longer than the time period of a second phase of the two cooldown phases, with the second phase immediately following the first phase, wherein the hot-formed and press-hardened part is cooled down in the first phase of the cooldown to a temperature between 500° C. and 700° C. and in the second phase to a temperature below 200° C., and
    wherein a transition zone between the at least one region and the other region is less than 50 mm.

2. The method of claim 1, wherein the heat-up temperature in a temperature range between 550° C. and 800° C.

3. The method of claim 1, wherein the heat-up temperature in a temperature range between 700° C. and 800° C.

4. The method of claim 1, wherein the heating step is executed in the region of joining flanges of the hot-formed and press-hardened part.

5. The method of claim 1, wherein the heating step is executed in the region of an opening of the hot-formed and press-hardened part.

6. The method of claim 1, wherein the heating step is executed in the region of a coupling location of the hot-formed and press-hardened part with another part.

7. The method of claim 6, further comprising coupling the hot-formed and press-hardened part with the other part by thermal joining.

8. The method of claim 1, wherein the region is heated to the heat-up temperature within a time interval of up to 30 seconds.

9. The method of claim 1, wherein the region is heated to the heat-up temperature within a time interval of up to 20 seconds.

10. The method of claim 1, wherein the region is heated to the heat-up temperature within a time interval of up to 10 seconds.

11. The method of claim 1, wherein the region is heated to the heat-up temperature within a time interval of up to 5 seconds.

12. The method of claim 1, wherein the holding time is up to 30 seconds.

13. The method of claim 1, wherein the holding time is up to 20 seconds.

14. The method of claim 1, wherein the holding time is up to 10 seconds.

15. The method of claim 1, wherein the holding time is up to 5 seconds.

16. The method of claim 1, wherein the time period of the second phase is up to 120 seconds.

17. The method of claim 1, wherein the time period of the second phase is up to 60 seconds.

18. The method of claim 1, wherein the heat-up temperature is attained by inductive heating.

19. The method of claim 1, wherein the heat-up temperature is attained by infrared heating.

20. The method of claim 1, wherein the heat-up temperature is in a temperature range between 500° C. and 900° C.

* * * * *